United States Patent [19]

Broberg, Jr.

[11] 4,363,604
[45] Dec. 14, 1982

[54] PROPELLER SPINNER FOR MODEL AIRPLANES OR THE LIKE

[75] Inventor: Dewey O. Broberg, Jr., Long Grove, Ill.

[73] Assignee: Du-Bro Products, Wauconda, Ill.

[21] Appl. No.: 223,265

[22] Filed: Jan. 8, 1981

[51] Int. Cl.³ .............................................. B64C 11/14
[52] U.S. Cl. ................................ 416/245 R; 403/348
[58] Field of Search ................. 416/245 R, 245 A; 403/348, 349, 353

[56] References Cited

U.S. PATENT DOCUMENTS

| | | |
|---|---|---|
| 1,730,742 | 10/1929 | Nelson . |
| 1,878,907 | 9/1932 | Staats, Jr. . |
| 1,978,039 | 10/1934 | Caldwell et al. . |
| 2,353,431 | 7/1944 | Arden . |
| 2,371,801 | 3/1945 | Chester et al. . |
| 2,394,749 | 2/1946 | Chester . |
| 2,534,662 | 12/1950 | Froom . |
| 2,765,858 | 10/1956 | Hardy . |
| 3,199,602 | 8/1965 | Ratering . |
| 3,299,964 | 1/1967 | Foster . |
| 3,703,341 | 11/1972 | Garofalo . |
| 3,799,693 | 3/1974 | Hull . |
| 3,822,963 | 7/1974 | Goldberg . |
| 3,880,546 | 4/1975 | Segal ........................ 403/348 UX |

FOREIGN PATENT DOCUMENTS

H23354 1/1956 Fed. Rep. of Germany ...... 403/348

Primary Examiner—Philip R. Coe
Assistant Examiner—Joseph M. Pitko
Attorney, Agent, or Firm—Hosier, Niro & Daleiden, Ltd.

[57] ABSTRACT

A spinner is disclosed for use with a model airplane, or the like, which has a propeller on a propeller shaft, the propeller being disposed between a thrust plate fixed to the propeller shaft and retaining means such as a propeller nut threaded onto the propeller shaft. A base plate has an axial passage for receiving the propeller shaft and the propeller nut holds the base plate between the thrust plate and the propeller for conjoint rotation therewith. An air piercing nose cone is releasably mounted to the base plate and has radial openings for receiving the shanks of the propeller blades. A locking ring is rotatably mounted on the base plate for rotation relative thereto about the axis of the propeller shaft between a locking position and a release position. The nose cone has at least one interior stud having a radial notch for engagement by a locking edge of the locking ring when in said locking position to releasably hold the nose cone on the base plate for conjoint rotation therewith.

26 Claims, 6 Drawing Figures

U.S. Patent  Dec. 14, 1982  4,363,604
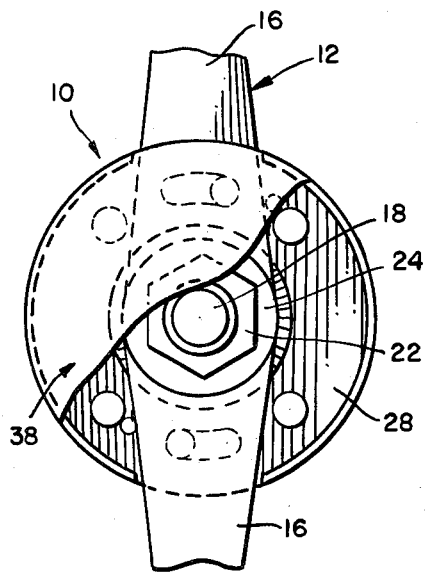
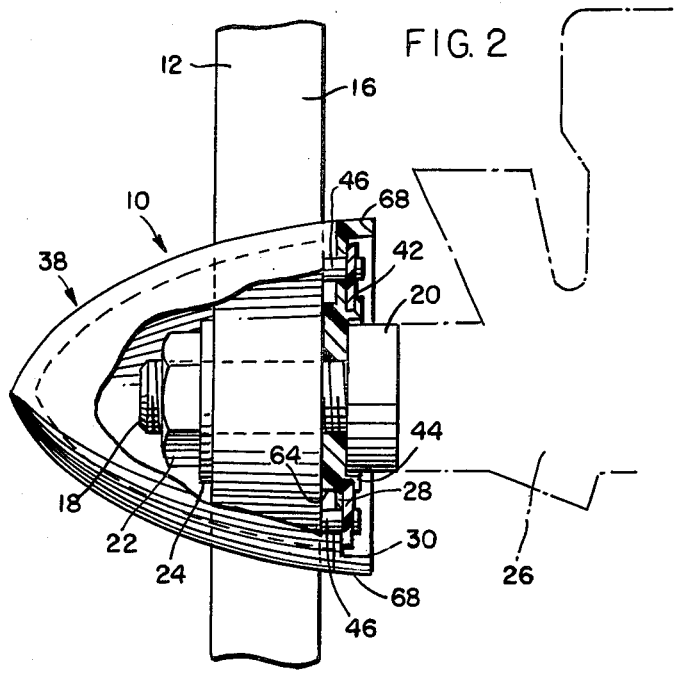
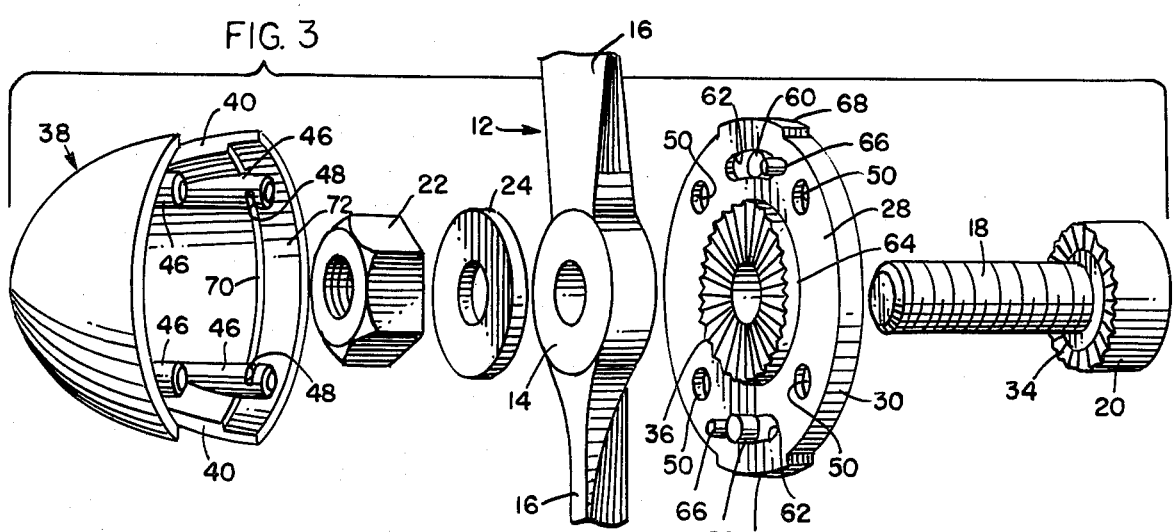
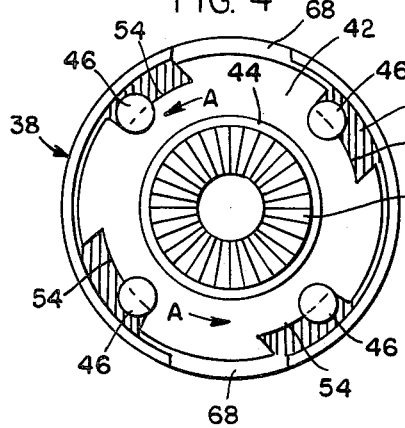
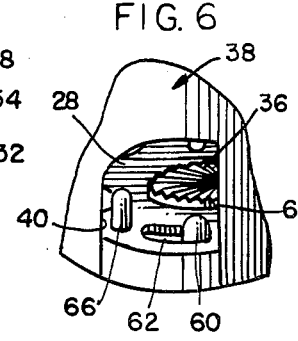
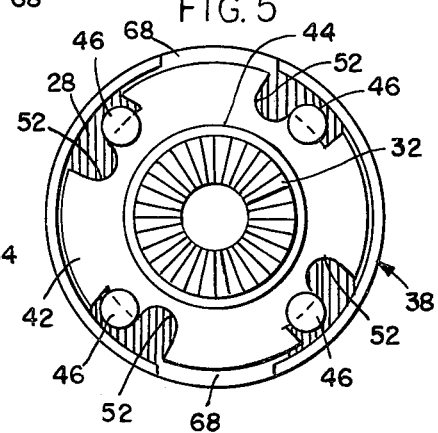

PROPELLER SPINNER FOR MODEL AIRPLANES OR THE LIKE

BACKGROUND OF THE INVENTION

The present invention relates to a propeller spinner for model airplanes, and particularly to such a spinner which is exceptionally easy to install and remove or dismount to gain access to the airplane propeller and the retaining means therefor.

Model airplanes, as well as various outboard marine assemblies, include a propeller on a propeller shaft, with the propeller being disposed between a thrust plate fixed to the propeller shaft and retaining means such as a propeller nut threaded onto the propeller shaft. In many model airplanes, the thrust plate is directly associated with the engine thereof. A streamlined spinner normally is employed over the propeller hub and the retaining means. The spinner is generally hollow for housing the propeller hub and retaining means, and is generally axially symmetrical for aerodynamic purposes. It is quite desirable for the spinner to be releasably mounted and readily removable for access to the propeller hub and its retaining means for servicing the same, for instance to tighten or replace the propeller.

Many attempts have been made to provide a propeller spinner which is easy to install and remove or dismount. For example, threaded connections have been used for joining the propeller spinner to the propller shaft and a special tool must be used to disassemble the propeller spinner. This is rather complicted and expensive and is not very desirable for servicing in the field. Other spinner assemblies utilize bolts or screws, some of which remain permanently in position on the spinner, again requiring tools for installing and removing the spinner in the field.

Still other prior devices employ a rigid disc mounted behind the propeller around essentially the entire circumference of which the spinner must be snapped or elastically engaged to make connection with the disc. This is an acceptable assembly but one which heretofore presents difficulty in positioning and as far as mounting and dismounting of the spinner are concerned. Often times the spinner is spontaneously released by a quick unsnapping action from the mounting disc, causing painful bruising to an operator's hands. With a more loose fit between the spinner and mounting disc, the spinner gradually loosens during operation and vibration of the airplane engine.

The present invention is directed to solving these problems by providing a new and improved spinner or spinner assembly which requires no bolts, screws, or other fastening means requiring the use of tools in the field and does not require any considerable force for removing the spinner from its mounting.

SUMMARY OF THE INVENTION

An object, therefore, of the present invention is to provide a propeller spinner for model airplanes, or the like, and particularly to spinner assembly which is exceptional easy to install and remove or dismount.

Another object of the invention is to provide a propeller spinner which requires no bolts, screws, or other locking devices which require the use of tools to either assemble or disassemble the spinner.

A further object of the invention is to provide a propeller spinner which is completely streamlined and does not have any slots, tabs, or other visable components such as back plates to detract from its appearance. There are substantially no exterior parting lines to collect dirt.

In the exemplary embodiment of the invention, a spinner is provided for use with a model airplane, or the like, which has a propeller on a propeller shaft. The propeller is disposed between a thrust plate fixed to the propeller shaft and retaining means such as a propeller nut threaded onto the propeller shaft. A base plate has a passage for receiving the propeller shaft axially therethrough. The base plate is positionable between the thrust plate and the propeller and held in such assembly for conjoint rotation by the propeller nut. An air piercing nose cone is disposed in front of the propeller and has a base portion engageable with the base plate. The nose cone has radial openings for receiving the shanks of the propeller blades. Locking means is mounted on the base plate for movement relative thereto between a locking position and a release position. Engaging means is disposed on the nose cone complementarily engageable by the locking means of the base plate when in the locking position to hold the nose cone on the base plate for conjoint rotation therewith. The engaging means is disengaged by the locking means when in the release position thereof to permit the nose cone to be readily removed for access to the propeller hub and its retaining means.

The locking means on the base plate comprises a locking ring rotatably mounted on the back side of the base plate for rotation relative thereto about the axis of the propeller shaft between locking and release positions. The locking ring is a generaly flat, disc shaped member rotatable in a plane generally perpendicular to the propeller shaft and having at least one locking edge.

The engaging means on the nose cone comprises at least one interior stud protuding through a bore in the base plate and having a radial notch for engagement therein by the locking edge of the locking ring.

The locking ring has at least one pin extending forwardly through an angularly elongated slot in the base plate and located whereby the pin is accessible through one of the radial openings in the nose cone for moving the locking ring between its locking and release positions.

Another feature of the invention resides in the nose cone comprising an axially symmetrical and hollow dome having a base surface portion for engaging the base plate, and a base skirt portion overlying the circumferential periphery of the base plate, whereby the base plate is substantially hidden within the nose cone. An advantage of this assembly is that parting lines on the exterior of the spinner which normally collect dirt are substantially eliminated.

Furthermore, the base plate includes radially extending tabs protruding into the radial openings in the nose cone, with the tabs terminating in smooth peripheral surfaces forming a smooth continuation of the exterior of the symmetrical dome for a streamlined appearance.

Other objects, features and advantages of the invention will be apparent from the following detailed description taken in connection with the accompanying drawings.

DESCRIPTION OF THE DRAWINGS

The features of this invention which are believed to be novel are set forth with particularly in the appended claims. The invention, together with its objects and the advantages thereof, may be best understood by reference to the following description taken in conjunction with the accompanying drawings, in which like reference numerals identify like elements in the figures and in which:

FIG. 1 is a front view of the spinner assembly of the present invention, with portions of the nose cone and propeller blades broken away to facilitate the illustration;

FIG. 2 is a side view of the spinner assembly of the present invention, with portions of the nose cone and propeller blades broken away to facilitate the illustration, and with portions of the base plate and locking ring in section;

FIG. 3 is an exploded perspective view of the spinner assembly of the present invention;

FIG. 4 is an elevational view of the rear of the spinner assembly of the present invention, with the locking ring in its release position for receiving the studs of the nose cone;

FIG. 5 is a rear view similar to that of FIG. 4, with the locking ring in its locking position in engagement with the notches in the studs of the nose cone; and FIG. 6 is a fragmented perspective view looking through one of the radial openings in the nose cone to illustrate the top or front of the base plate.

DETAILED DESCRIPTION OF THE INVENTION

Referring to the drawings in greater detail, and first to FIGS. 1-3, the spinner or spinner assembly of the present invention, generally designated 10, is designed for use with a model airplane, or the like, which has a propeller, generally designated 12, having a propeller hub 14 (FIG. 3) and propeller blades 16. The propeller is mounted on a propeller shaft 18 between a thrust plate 20 of the airplane engine fixed to propeller shaft 18 and retaining means such as a propeller nut 22 threaded onto the propeller shaft. A washer 24 is disposed between the propeller nut and propeller hub 14. Thrust plate 20 is disposed at the front end of an engine or other operative component of the airplane shown in phantom in FIG. 2, as at 26.

The spinner assembly of the present invention includes a base plate 28 which is generally circular and has a rearwardly extending, peripheral circular flange 30. The base plate has a rear serrated surface portion 32 (FIGS. 4 and 5) for engaging a front serrated surface portion 34 (FIG. 3) of thrust plate 20 for driving engagement therewith. The base plate has a front serrated surface portion 36 (FIG. 3) for driving engagement with a complementary serrated surface portion (not shown) on the rear of propeller hub 14.

The spinner assembly includes an air piercing nose cone, generally designated 38, disposed in front of propeller 12. The nose cone has a base portion (described in greater detail hereinafter) engageable with base plate 28. The nose cone also has a pair of radial openings 40 (FIG. 3) for receiving the shanks of propeller blades 16 therethrough.

Locking means is mounted on base plate 28 for movement relative thereto between a locking position and a release position in operative association with nose cone 38. More particularly, as best seen in FIGS. 2, 4 and 5, the locking means includes a locking ring 42 rotatably mounted on the rear or back side of the base plate for rotation relative thereto about the axis of propeller shaft 18 between its locking and release positions. To this end, a radially outwardly extending lip or flange 44 (FIGS. 3, 4 and 5) receives the inner circular edge of locking ring 42 to permit mounting and relative rotation between the locking ring and the base plate.

Engaging means is provided on nose cone 38 complementarily engageable by locking ring 42 to hold the nose cone on base plate 28 for conjoint rotation therewith. More particularly, referring to FIG. 3, the engaging means comprises four interior studs 46 disposed within and protruding rearwardly of the nose cone. Each stud has a notch or slot 48 facing radially inwardly thereof. It also can be seen in FIG. 3 that base plate 28 has four bores 50 extending axially therethrough for receiving studs 46 of nose cone 38, with the studs extending entirely through the base plate so that notches 48 are disposed on the rear side of the base plate in planar alignment with locking ring 42.

Referring to FIGS. 4 and 5, the four studs 46 are shown protruding through the four bores in base plate 28. Locking ring 42 includes four recessed areas about the outer peripheral edge thereof. Each recessed area includes an enlarged, rounded portion 52 (FIG. 5) and an angularly extending straight edge portion 54 (FIG. 4). With this design of the enlarged rounded portions 52 of the recessed areas at the peripheral edge of locking plate 42, studs 46 of nose cone 38 can pass freely therethrough as shown in FIG. 4. This defines the release position of locking plate 42 to permit the nose cone to be readily mounted and dismounted or removed for access to propeller 12 and its retaining means, propeller nut 22, for servicing or replacement of the propeller.

Locking ring 42 is rotatable from the release position shown in FIG. 4, in the direction of arrows A, to the locking position shown in FIG. 5. In this locking position, edge portions 54 of locking plate 42 enter notches 48 on the inside of nose cone studs 46 to securely retain the nose cone axially on base plate 28. Of course, with studs 46 extending through bores 50 in the base plate, the nose cone is secured against angular movement relative to the base plate.

Referring to FIGS. 3 and 6, means is provided for locking and releasing locking ring 42 from the front of base plate 28 through the radial openings 40 in nose cone 38. More particularly, a pair of pins 60 are molded integral with and protrude forwardly from locking ring 42 through a pair of angularly elongated slots 62 in base plate 28. Thus, the locking ring can be rotated between its locking and release positions (FIGS. 5 and 4, respectively) from the front side of base plate 28 through the openings in the nose cone. To this end, it can be seen that serrated surface 36 on the front of the base plate is formed on top of a raised hub portion 64 of the base plate to space propeller hub 14 away from the base plate. This permits a wide variety of devices, ranging from a simple screwdriver, blunt knife, or the like, to be inserted through nose cone openings 40, between the propeller hub and the base plate, to rotate the locking ring by engagement with one of the pins 60. A pair of pins 66 are molded integral with base plate 38 and protrude axially outwardly or forwardly thereof for locating and operatively engaging the shanks of propeller blades 16.

Keying means is provided between nose cone 38 and base plate 28 for accurately aligning nose cone openings 40 with pins 60 and 66, and for accurately aligning nose cone studs 46 with bores 50 in base plate 28. More particularly, the keying means comprises a pair of radially extending tabs 68 protruding outwardly from the periphery of base plate 28 and its peripheral flange 30 into engagement within the radial openings 40 in nose cone 38.

Another feature of the invention is the design of nose cone 38 for mounting on base plate 28 whereby the base plate is substantially hidden within the base of the nose cone and also to eliminate substantially all parting lines which might accumulate dirt. To this end, nose cone 38 is provided with a base surface portion in the form of a shoulder 70 (FIG. 3) for engaging the forward or top peripheral edge of base plate 28. Shoulder 70 forms a base skirt portion 72 (FIG. 3) of the nose cone for overlying the circumferential periphery of base plate 28 defined by peripheral flange 30 thereof. Thus, with this design, the base plate is substantially hidden within the nose cone, providing a completely streamlined and aerodynamic assembly, and eliminating parting lines which might accumulate dirt therein.

It will be understood that the invention may be embodied in other specific forms without departing from the spirit or central characteristics thereof. The present examples and embodiments, therefor, are to be considered in all respects as illustrative, and the invention is not to be limited to the details given herein.

What is claimed is:

1. A spinner for use with a model airplane, or the like, which has a propeller on a propeller shaft, the propeller having propeller blades with shanks, and the propeller being disposed between a thrust plate fixed to the propeller shaft and retaining means such as a propeller nut threaded onto the propeller shaft, comprising:
   a base plate having a passage for receiving the propeller shaft axially therethrough, said base plate being positionable between the thrust plate and the propeller and held in such assembly for conjoint rotation by said propeller nut;
   an air piercing nose cone located forwardly of the propeller and having a base portion engageable with said base plate, said nose cone having radial openings for receiving the shanks of the propeller blades;
   locking means mounted on said base plate for movement relative thereto between a locking position and a release position; and
   engaging means on said nose cone complementarily engageable by said locking means when in said locking position to hold the nose cone on said base plate for conjoint rotation therewith, said engaging means being disengaged by said locking means when in said release position to permit the nose cone to be readily removed for access to said retaining means.

2. The spinner of claim 1 wherein said locking means comprises a rotatable member movable between said positions.

3. The spinner of claim 2 wherein said rotatable member comprises a locking ring rotatably mounted on said base plate for rotation relative thereto about the axis of the propeller shaft between said positions.

4. The spinner of claim 3 wherein said locking ring is rotatably mounted on the back side of said base plate.

5. The spinner of claim 4 whereing said engaging means on said nose cone protrudes through said base plate for engagement by said locking ring on the back side of the base plate.

6. The spinner of claim 5 wherein said locking ring has at least one pin extending forwardly through an angularly elongated slot in said base plate and located whereby the pin is accessible through one of the radial openings in said nose cone for moving said locking ring between said positions.

7. The spinner of claim 5 wherein said locking ring is a generally flat, disc shaped member rotatable in a plane generally perpendicular to the propeller shaft and having at least one locking edge, said engaging means on said nose cone comprising at least one interior stud protruding through a bore in said base plate and having a radial notch for engagement therein by said locking edge of said locking ring.

8. The spinner of claim 7 wherein said locking ring includes a plurality of said locking edges, said base plate includes a plurality of said bores, and said nose cone includes a plurality of said studs extending through said bores, all of which are complementarily equally spaced about the axis of the propeller shaft.

9. The spinner of claim 8 wherein said locking ring has at least one pin extending forwardly through an angularly elongated slot in said base plate and located whereby the pin is accessible through one of the radial openings in said nose cone for moving said locking ring between said positions.

10. The spinner of claim 1 including keying means between said nose cone and said base plate for accurately aligning said engaging mens and said locking means.

11. The spinner of claim 10 wherein said keying means comprises at least one radially extending tab protruding from said base plate into engagement within one of said radial openings in said nose cone.

12. The spinner of claim 1 wherein said base plate has at least one pin fixed thereto and protruding axially outwardly thereof adjacent one of said radial openings in said nose cone for locating and operatively engaging the shank of one of the propeller blades.

13. The spinner of claim 1 wherein said nose cone comprises an axially symmetrical and hollow dome having a base surface portion for engaging said base plate, and a base skirt portion overlying the circumferential periphery of the base plate whereby the base plate is substantially hidden within the nose cone.

14. The spinner of claim 13 wherein said base plate includes radially extending tabs protruding into said radial openings in said nose cone, said tabs terminating in smooth peripheral surfaces forming a smooth continuation of the exterior of said symmetrical dome.

15. A spinner for use with a model airplane, or the like, which has a propeller on a propeller shaft, the propeller having propeller blades with shanks, and the propeller being disposed between a thrust plate fixed to the propeller shaft and retaining means such as a propeller nut threaded onto the propeller shaft, comprising:
   a base plate having a passage for receiving the propeller shaft axially therethrough, said base plate being positionable between the thrust plate and the propeller and held in such assembly for conjoint rotation by said propeller nut;
   an air piercing nose cone located forwardly of the propeller and having a base portion engageble with said base plate, said nose cone having radial openings for receiving the shanks of the propeller blades;
   a generally flat, disc shaped locking ring rotatably mounted on said base plate for rotation about the axis of the propeller shaft for movement relative to the base plate between a locking position and a release position, said locking ring having at least one locking edge; and engaging means on said nose cone comprising at least one interior stud having a radial notch for engagement therein by said locking edge of said locking ring when the locking ring is in said locking position to hold the nose cone on said base plate for conjoint rotation therewith, said locking edge being movable out of said radial notch when in said release position to permit the nose cone to be readily removed for access to said retaining means.

16. The spinner of claim 15 wherein said locking ring is rotatably mounted on the back side of said base plate.

17. The spinner of claim 16 wherein said stud protrudes from said nose cone through a bore in said base plate for engagement by said locking ring.

18. The spinner of claim 17 wherein said locking ring includes a plurality of said locking edges, said base plate includes a plurality of said bores, and said nose cone includes a plurality of said studs extending through said bores, all of which are complementarily equally spaced about the axis of the propeller shaft.

19. The spinner of claim 18 wherein said locking ring has at least one pin extending forwardly through an angularly elongated slot in said base plate and located whereby the pin is accessible through one of the radial openings in said nose cone for moving said locking ring between said positions.

20. The spinner of claim 19 including keying means between said nose cone and said base plate for accurately aligning said engaging means and said locking means.

21. The spinner of claim 20 wherein said keying means comprises at least one radially extending tab protruding from said base plate into engagement within one of said radial openings in said nose cone.

22. The spinner of claim 15 wherein said base plate has at least one pin fixed thereto and protruding axially outwardly thereof adjacent one of said radial openings in said nose cone for locating and operatively engaging the shank of one of the propeller blades.

23. A spinner for use with a model airplane, or the like, which has a propeller on a propeller shaft and retaining means for securing the propeller to the shaft, comprising:

a base plate having a passage for receiving the propeller shaft axially therethrough, with said propeller and said retaining means being disposed axially outwardly of said base plate;

an air piercing nose cone located forwardly of the propeller and engageable with said base plate;

locking means mounted on said base plate for movement relative thereto beteen a locking position and a release position; and engaging means on said nose cone complementarily engageable by said locking means when in said locking position to hold the nose cone on said base plate for conjoint rotation therewith, said engaging means being disengaged by said locking means when in said release position to permit the nose cone to be readily removed for access to said retaining means.

24. The spinner of claim 23 wherein said locking means comprises a locking ring rotatably mounted on said base plate for rotation relative thereto about the axis of the propeller shaft between said positions.

25. The spinner of claim 24 wherein said locking ring is a generally flat, disc shaped member rotatable in a plane generally perpendicular to the propeller shaft and having at least one locking edge, said engaging means on said nose cone comprising at least one interior stud having a radial notch for engagement therein by said locking edge of said locking ring.

26. A spinner for use with a model airplane, or the like, which has a propeller on a propeller shaft and retaining means for securing the propeller to the shaft, the propeller having propeller blades with shanks, comprising:

a base plate having a passage for receiving the propeller shaft axially therethrough, with said propeller and said retaining means being disposed axially outwardly of said base plate;

an air piercing nose cone located forwardly of the propeller and engageable with said base plate, said nose cone comprising an axially symmetrical and hollow dome having a base surface portion for engaging said base plate and a base skirt portion overlying the circumferential periphery of the base plate whereby the base plate is substantially hidden within the nose cone, said nose cone having radial openings for receiving the shanks of the propeller blades, and said base plate including radially extending tabs protruding into said radial openings in said nose cone, said tabs terminating in smooth peripheral surfaces forming a smooth continuation of the exterior of said symmetrical dome.

* * * * *